Nov. 19, 1935.  R. T. STOCK  2,021,526
VARIABLE SPEED GEAR
Filed July 17, 1934  3 Sheets-Sheet 1
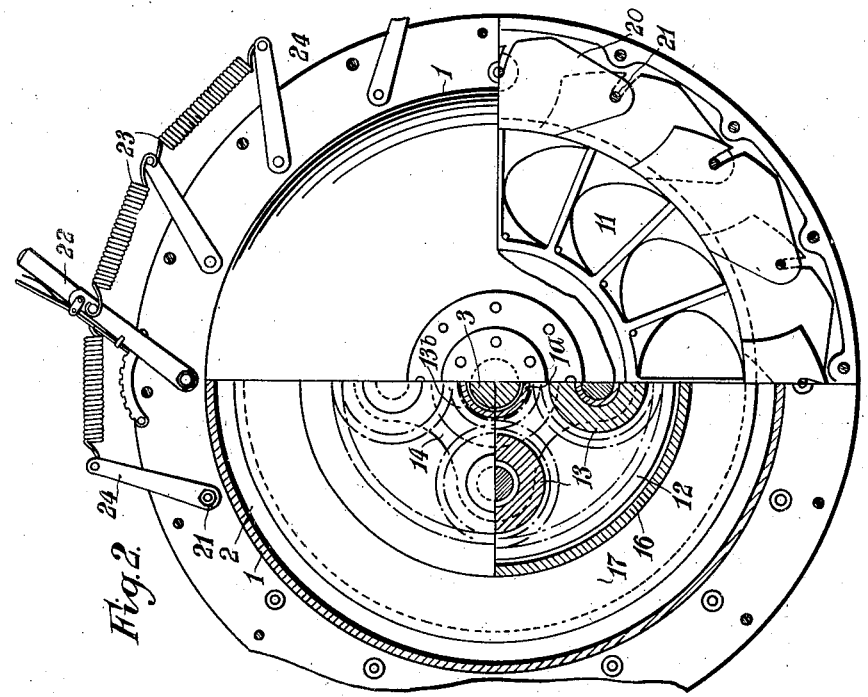
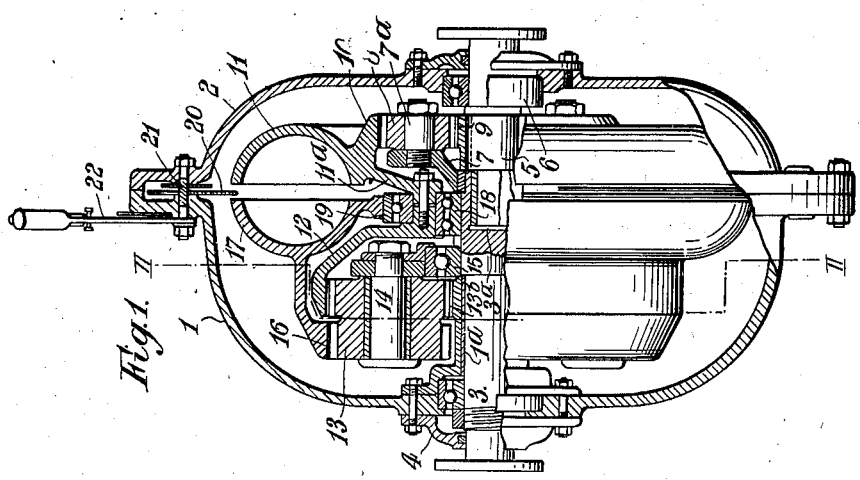
Inventor
Roland Treasure Stock,
By Potter, Pierce & Scheffler,
Attorneys.

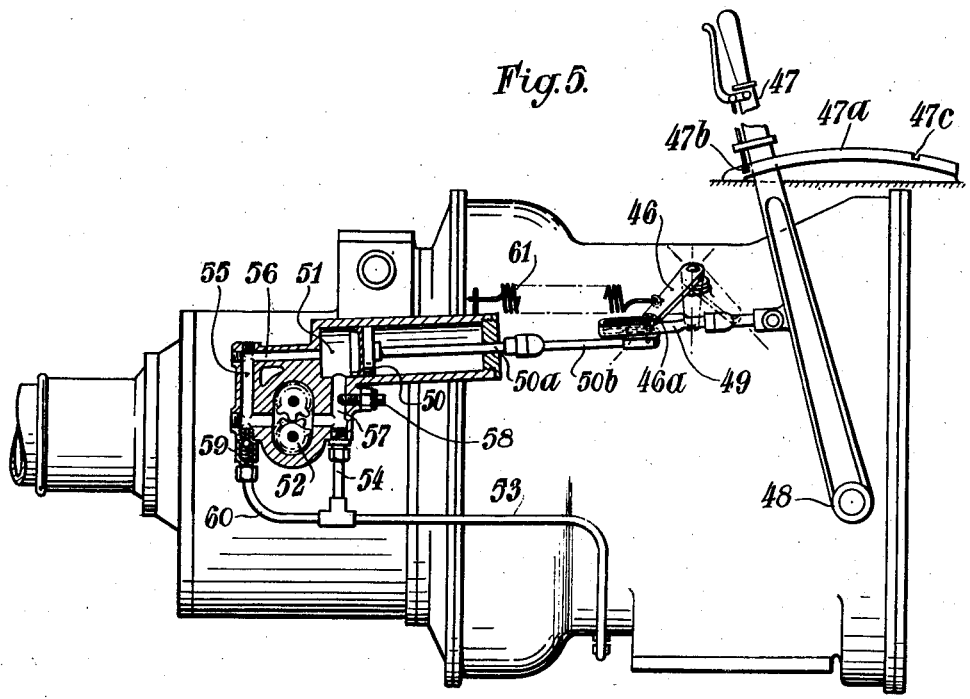
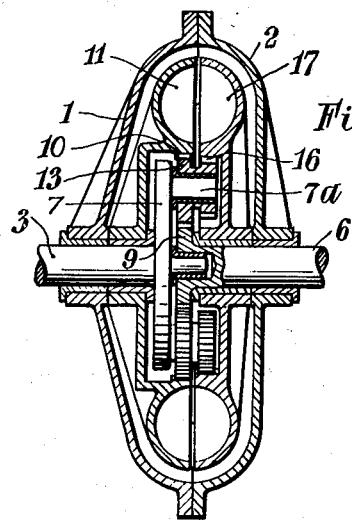

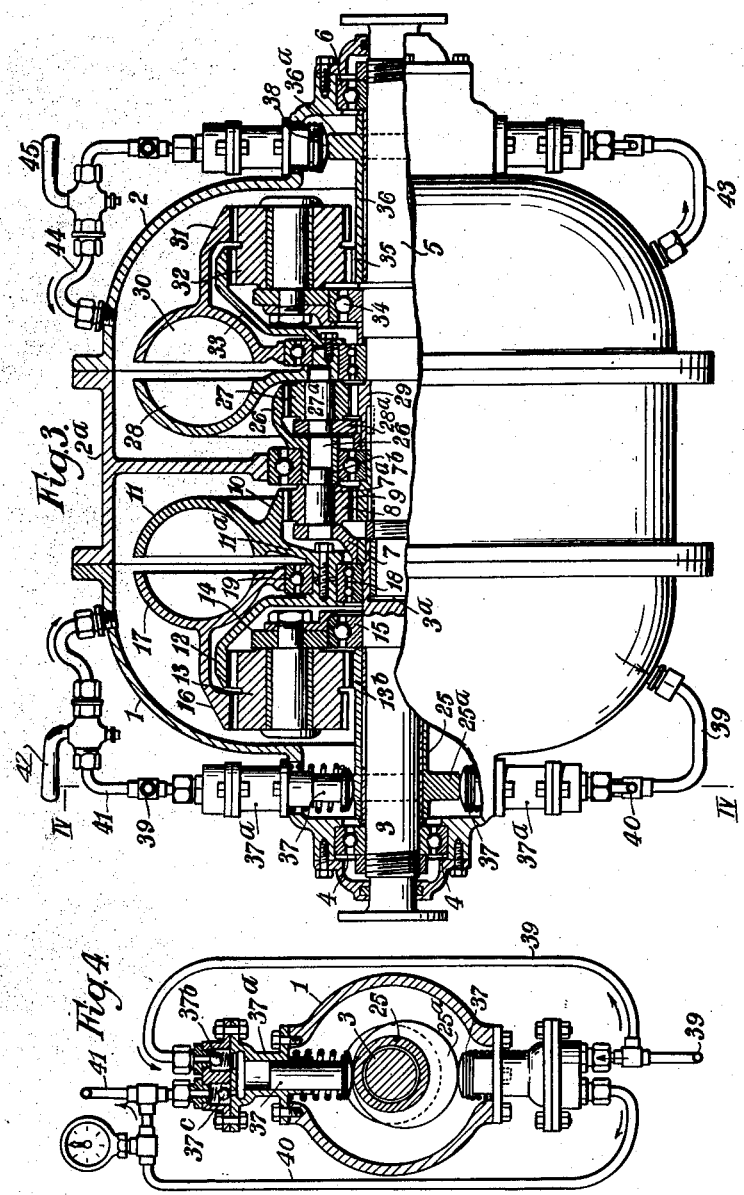

Patented Nov. 19, 1935

2,021,526

UNITED STATES PATENT OFFICE 2,021,526

VARIABLE SPEED GEAR

Roland Treasure Stock, Hendon, England

Application July 17, 1934, Serial No. 735,708
In Great Britain July 27, 1933

19 Claims. (Cl. 74—293)

This invention relates to variable speed gearing for the transmission of power and has for its object to provide simple and effective means for varying the speed ratio between the driving and driven members in a power transmission system.

The invention relates to variable speed gearing of the type comprising an epicyclic or differential gear train having a driving member, a driven member and a reaction member, and a hydraulic coupling for applying a controlling action or force to said reaction member for the purpose of varying the speed ratio between the driving and driven members. The hydraulic coupling may be of any known type, of the primary and secondary vane wheel type, such as the well-known Fottinger type (see for example British Patent Specification No. 13,864 of 1906) or the inclined vane type (see for example British Patent Specification No. 1,163 of 1877). One or more couplings may be used as desired.

According to the present invention, in variable speed gearing of the type specified, the reaction member is subject to the control of the primary element of the hydraulic coupling the secondary element of which is geared to the primary element so that the gear ratio between the two elements cannot exceed a fixed or fixable maximum.

According to the invention, moreover, in variable speed gearing of the type specified the reaction member is subject to the control of the primary element of a hydraulic coupling the secondary element of which is geared to the primary element so that the gear ratio is fixed at a ratio near to unity or is fixable in such a ratio.

The invention furthermore includes variable speed gearing of the type specified wherein the reaction member is subject to the control of the primary element of a hydraulic coupling the secondary element of which is geared to the primary element so that the hydraulic coupling elements are either constrained or constrainable to rotate in the same direction at nearly equal speeds. The gearing between the primary and secondary elements of the hydraulic coupling may be adapted to be controlled to permit variation of the amount of relative rotation between the coupling elements from zero up to a maximum which is the intrinsic ratio of the said gearing.

According to the invention moreover, in variable speed gearing of the type specified, the reaction member is subject to the control of the primary element of a hydraulic coupling the secondary and primary elements of which are connected to toothed gears which are in constant mesh with the two elements of stepped planetary gears adapted to be constrained. The controlling planetary gears may be adapted in turn to be controlled so as to permit variation of the amount of relative rotation between the elements of the coupling from zero up to a maximum determined by the intrinsic ratio of said planetary gearing.

The primary and secondary elements of the hydraulic coupling may be geared together by the provision in connection with each element of the hydraulic coupling of an annulus and of stepped planetary pinions co-operating therewith and with a sun wheel which is normally held from rotation but may be released so as to be rotatable either freely or to a controllable degree.

The invention furthermore embraces variable speed and reversing gearing comprising two controlled gear sets as hereinbefore specified in which a variable drive is obtained in one direction or the other at will by operating upon one or the other alternatively of the two controlling hydraulic couplings. The driving shaft may be secured to different train members of the respective epicyclic trains so that the two gear trains act on a driven shaft or member in opposite directions, means being provided for rendering the gearing between the two elements of one coupling inoperative while the drive is transmitted through the gear controlled by the other coupling.

The means for controlling the mechanical gearing between the elements of the hydraulic coupling may comprise a plunger pump or pumps coacting with one or more cams or eccentrics coupled with a sun wheel meshing with the planetary pinions by which the respective elements of the hydraulic coupling are geared together, and valves regulating the delivery of such pump or pumps.

In a preferred embodiment, one element of the hydraulic coupling is geared to the other element so that the relative speeds of the two elements cannot exceed a fixed ratio of between 90 and 99 revolutions per minute of the secondary element to 100 revolutions per minute of the primary gear.

Means may be provided for regulating the torque transmitted through the hydraulic coupling or couplings.

The invention is hereinafter described by way of example with reference to the accompanying drawings in which—

Figure 1 is a vertical longitudinal section illustrating one construction of variable speed gearing in accordance with the invention;

Figure 1a is a similar view illustrating a modified construction;

Figure 2 is an end elevation partly in section on the line II—II, Figure 1;

Figure 3 is a side elevation partly in longitudinal section illustrating a modification in which provision is made for variable reverse gear; and Figure 4 is a cross section on the line IV—IV, Figure 3.

Figure 5 is a part sectional side elevation illustrating one embodiment of combined manual and speed governed regulating means as applied to a variable speed gearing according to the invention.

In carrying the invention into effect according to one construction and with reference to Figures 1 and 2 of the accompanying drawings, a gear casing is provided which is constructed of two parts 1, 2 bolted together so as to enclose the gear mechanism which is operated submerged or "drowned" in liquid, preferably lubricating oil. The driving shaft 3 is journalled at one end in a bearing 4 carried by the part 1 of the casing and at the other end is formed with an axial bore 3a for the reception of the adjacent end of the driven shaft 5 the other end of which is journalled in a bearing 6 carried in the part 2 of the casing. A spider 7 is fixed on the shaft 3 and is provided with pins 7a on which are mounted planetary pinions 8 engaging with a sun wheel 9 fixed on the driven shaft 5, the said pinions 8 also engaging with an annulus 10 which constitutes the reaction member before referred to of the epicyclic gear train. The reaction member 10 carries one element 11 of the hydraulic coupling and this element 11 is formed with an inwardly extending flange 11a bolted to a flanged annulus 12 which engages with one part of stepped planetary pinions 13 mounted on a spider 14 which is carried by a bearing 15 so as to be freely rotatable on the shaft 3. This part of the pinions 13 also engages a fixed sun wheel 13b carried by a sleeve 1a bolted to the part 1 of the casing. The other part of the stepped planetary pinions 13 engages with an annulus 16 to which the second element 17 of the hydraulic coupling is attached. The assembly constituted by the element 11, the annulus 10 and flange 11a, and the annulus 12 is carried by a bearing 18 so as to be rotatable on the shaft 3, while the element 17 and annulus 16 are carried by a bearing 19 so as to be rotatable on the said assembly. The two parts of the pinions 13 being of different diameters, the larger diameter being in engagement with the annulus 12 coupled to the reaction member 10, the two elements 11, 17 of the hydraulic coupling will rotate in the same direction at different speeds, the element 17 being rotated at a slower speed than the element 11. In a preferred arrangement this difference of speed is such that the element 17 of the coupling is three per cent slower than the element 11 thereof.

In operation, assuming the driving shaft 3 is rotated in a clockwise direction, as viewed from the left, the planetary pinions 8 on the driving spider 7 will travel round the driven sun wheel 9 in a clockwise direction, provided that the load on the driven shaft 5 resists rotation of the sun wheel 9. In the course of travelling round the sun wheel 9 the planetary pinions 8 will themselves be rotated about their respective pivots 7a in a clockwise direction with the result that a clockwise rotation will be imparted to the reaction member 10. This clockwise rotation of the reaction member 10 will impart, through the annulus 12, a clockwise rotation to the stepped planetary pinions 13 which, in turn, will impart a clockwise rotation to the annulus 16 associated with the element 17 of the hydraulic coupling, but at a slower speed than the element 11 associated with the reaction member 10. The secondary element 17 thus encounters the flow of liquid from the primary element 11, the liquid having a vortex motion between the two elements due to the difference in their speeds, and thus the torque in the primary element 11 is transmitted to the secondary element. The torque in the secondary element 17 reacts in the opposite direction against the primary element 11 through the liquid and the stepped planetary pinions 13 with a loss of power proportional to the speed difference of the elements 11, 17. The reaction member 10 thus has the function of a rotating fulcrum the speed of which may be regulated so that the relative speeds of rotation of the driving and driven shafts 3, 5 may be varied, such variation of relative speeds being accompanied by an inverse variation of relative torques, the power in the driven shaft 5 being the same as the power in the driving shaft 3 less the loss due to friction.

In the modified construction shown in Figure 1a the driving shaft 3 is connected to a spider 7 provided with pins 7a for the planetary gears of the epicyclic gear train, the final drive being taken from the sun wheel 9 and transmitted through the shaft 6. The reaction member 10 of the epicyclic gear train is carried by the primary element 11 of the hydraulic coupling and meshes with the larger diameter of double stepped planetary pinions 13 the smaller diameter of which meshes with an annular gear 16 on the secondary element 17, the stepped planetary gears 13 being in this construction mounted on the pins 7a of the spider 7 and, in addition to gearing the elements 11 and 17 together, also constituting one of the members of the main epicyclic gear train.

For the purpose of regulating the forces acting in the coupling, any known means may be provided, such as sluice gates sliding between the vane wheels, ring valves, or adjustable vanes, or the forces may be regulated by varying the proximity of the elements of the coupling, by regulating the amount of liquid in the coupling, or by regulating the speed ratio between the elements of the coupling. In the embodiment illustrated in Figures 1 and 2 vanes 20 pivoted between the two parts 1, 2 of the casing on pins 21 are adapted to be operated, as by a hand lever 22 and springs 23 or other links acting on arms 24 so that the vanes 20 may be projected to a variable extent between the elements 11 and 17 of the coupling. In the embodiment illustrated in Figures 3 and 4 the partial closing of the control valve 42 permits the sleeve 25 and the sun wheel 13b a restricted motion and consequently varies the speed ratio of the elements 11 and 17 and thereby regulates the forces acting in the coupling. Similarly, the forces acting in the reverse gear coupling may be regulated by the control valve 45.

Such regulating means may be operated manually or automatically by means of a speed governor or may be operated partly automatically and partly manually. For example, as shown in Figure 5, an arm 46 may be connected either to a common operating member for the vanes 20 shown in Figures 1 and 2 or to one or both of the valves 42, 45 shown in Figure 3, such arm 46 being connected by a lost motion device to a hand lever 47 which may be pivoted at 48 and may co-operate with a quadrant 47a. The lost motion connection may comprise a slotted link 49 co-operating with a pin 46a on or engaging with the arm 46. The piston rod 50a of a piston 50 is connected by means of a link 50b to the pin 46a, the piston 50 working in a cylinder 51. A fluid pump 52, preferably of the gear type, is arranged so as to withdraw fluid through the pipe connections 53, 54 from the bottom of the gear-box casing and to force the fluid through the passages 55, 56 into the cylinder 51. The pump 52 is geared to or driven from the driven-shaft so that it rotates in accordance with the speed of the driven shaft and in order to adjust the pressure developed in the cylinder 51 a throttled by-pass passage 57 is provided to communicate between the cylinder 51 and the inlet side of the pump 52. By adjustment of the set-screw 58 the throttling effect in the passage 57 may be varied as desired. If the throttling effect is reduced, then a higher driven shaft speed has to be developed before a predetermined pressure in the cylinder 51 is attained and thus the device can be adjusted so that the piston 50 will operate the arm 46 at any desired driven shaft speed. The development of excess pressure in the cylinder 51 is prevented by means of a pressure relief valve 59 by which fluid may be permitted to pass from the outlet side of the pump through the passage 60 and the passage 54 back to the inlet side of the pump. A spring 61 is provided to return the arm 46 and the piston 50 to the initial position.

The arm 46 is so connected to the regulating means that in the position of the arm 46 shown in Figure 5 the gear is neutral or inoperative, while in the other extreme position of the arm 46 shown in dotted lines, the gear is fully operative. The position of the arm 46 is controlled between the neutral position and the half-way position by the lever 47 and the notches 47b, 47c respectively. In the position shown in the drawings, the lever 47 holds the arm 46 in the neutral position. Between the half-way position, determined by the engagement of the lever 47 with the notch 47c, and the forward gear position, indicated in broken lines, the arm 46 is controlled by the piston 50 operating against the return spring 61. The forces acting in the coupling are thus regulated partly manually by the lever 47 and partly automatically by the piston 50.

The sun wheel 13b in the arrangement shown in Figures 1 and 2 is fixed but, if desired, provision may be made, for instance, as hereinafter described with reference to Figure 3, for releasing the sun wheel 13b to permit its free rotation. When the sun wheel 13b is rotating freely the stepped planetary pinions 13 can revolve around the axis of the sun wheel 13b without rotation about their own axes and thus the two elements 11, 17 of the coupling can rotate at the same speed, in which case neutral gear is obtained.

In the embodiment of the invention illustrated in Figures 3 and 4, the variable reverse gear may be provided by utilizing alternatively two variable gear units such as described, arranged in combination, the driving shaft being coupled to different train members of the respective epicyclic or differential gear trains so that the said trains act on the driven shaft in opposite directions, and means being provided for rendering one of the variable gears inoperative while the drive is being transmitted through the other.

As illustrated in Figure 3, a variable gear consisting of an epicyclic gear train and hydraulic coupling is provided in one half of a casing conveniently constructed of three parts 1, 2a and 2, such variable gear being constructed as before described with reference to Figure 1 with the exception that the sun wheel 13b is carried by a sleeve 25 rotatable on the shaft 3 and having an eccentric or cam 25a co-operating with plungers 37 of oil pumps which are utilized in the manner hereinafter described to lock the sleeve 25 against rotation when the drive is to be transmitted through this gear unit.

A second variable gear unit is mounted in the other half of the casing, the annulus 26 of the epicyclic gear train being carried by a rotatable ring having holes 26a co-operating with extensions 7b of the pins 7a on the spider 7 fixed to the driving shaft 3 so that the annulus 26 is rigidly connected to such driving shaft 3. The planetary pinions 27 are mounted on pins 27a engaging holes in the central part of the primary element 28 of the hydraulic coupling, the outer ends of such pins 27a being located by a ring 28a. The sun wheel 29 is fixed on the driven shaft 5 and, in a similar manner to the construction before described, an annulus 33 is connected to the primary element 28 of the hydraulic coupling and engages one part of stepped planetary pinions 32 carried by a freely rotatable spider 34, this part of the stepped planetary pinions 32 also engaging with a sun wheel 35 on a sleeve 36 rotatable on the driven shaft 5 and having an eccentric or cam 36a co-operating with plungers 38 of oil pumps by which the sleeve 36 may be locked against rotation when desired. The other part of the stepped planetary pinions 32 engages with an annulus 31 associated with the secondary element 30 of the hydraulic coupling, the two parts of the stepped planetary pinions being of different diameters so that the element 30 of the coupling is driven in the same direction as, but at a slower speed than, the element 28 thereof.

As shown more particularly in Figure 4, the plungers 37 operate in cylinders 37a and engage the cam or eccentric 25a under the influence of springs. Oil is withdrawn from the interior of the casing through the pipe 39 and through this pipe is directed to the inlets of the oppositely disposed oil pumps, the oil being drawn in through inlet valves 37b and expelled through outlet valves 37c through pipes 40 and 41 and through a control valve 42 to the top of the casing.

The plungers 38 co-operating with the eccentric or cam 36a operate in a similar manner and withdraw oil from the casing through the pipe 43 and return the oil to the casing through the pipe 44 and valve 45.

It will be understood that by shutting the valve 42 so as to close the outlet from the respective pumps, the plungers 37 will act on the eccentric or cam 25a in such manner as to hold the sleeve 25 against rotation, and as the sun wheel 13b thereupon becomes fixed, the variable gear located in the left-hand half of the casing will function in the same manner as the gear shown in Figure 1, the valve 45 having been opened so that the plungers 38 permit the sleeve 36 to rotate freely and thus render the gear in the right-hand half of the casing inoperative.

For the purpose of reversing, the valve 42 is opened so that the sleeve 25 is permitted by the plungers 37 to rotate freely and thus render the gear in the left-hand half of the casing inoperative, and the valve 45 is closed so that the sleeve 36 with the sun wheel 35 is locked against rotation. The driving shaft 3 then acts through the spider 7, the pins 7a, and the annulus 26 on the epicyclic gear train of the gear in the right-hand half of the casing but, owing to the use of the planetary wheels 27 and pins 27a as the reaction member of the epicyclic gear train, the drive transmitted to the sun wheel 29 will be in the reverse direction, the coupling constituted by the elements 28, 30 geared together by the stepped planetary pinions 32 acting in the manner before described to provide a variable transmission between the shaft 3 and the shaft 5.

By opening both the valves 42 and 45, the sun wheels 13b and 35 are both released so as to be freely rotatable, and consequently the two elements of each hydraulic coupling are capable of rotating at the same speed and the whole of the gearing is rendered inoperative so that a neutral condition is attained.

It will be understood that the invention is not limited to the particular arrangement hereinbefore described.

I claim:

1. Variable speed gearing of the type specified comprising an epicyclic gear train having a driving member, a driven member and a reaction member, a hydraulic coupling having primary and secondary elements, the primary element being fixedly connected to the said reaction member, and planetary gearing arranged to control the relative speeds of the primary and secondary elements, the said planetary gearing comprising stepped planetary pinions meshing with toothed annular gears fixedly connected to the respective elements of the hydraulic coupling and rotatable around a fixed sun wheel.

2. Variable speed gearing of the type specified comprising an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, and means for normally holding the said sun wheel against rotation during operation of the gear and for allowing free rotation of the said sun wheel to permit the two elements of the hydraulic coupling to rotate at the same speed and thereby to render the gearing inoperative for the transmission of power.

3. Variable speed gearing of the type specified comprising an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, plunger pump mechanism co-operating with actuating means therefor associated with the said sun wheel, and valve means controlling the said plunger pump mechanism for permitting variation of the relative speeds of the two elements of the said hydraulic coupling from zero up to the maximum ratio determined by the gearing controlling the said elements.

4. Variable speed gearing of the type specified comprising an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, plunger pump mechanism, eccentric operating means fixedly connected to the said sun wheel and co-operating with the said plunger pump mechanism, and valve means controlling the said plunger pump mechanism for permitting variation of the relative speeds of the two elements of the said hydraulic coupling from zero up to the maximum ratio determined by the gearing controlling the said elements.

5. Variable speed gearing of the type specified comprising an epicyclic gear train in which the planetary pinions are carried by a spider fixedly connected to a main driving member, in which the sun wheel is fixedly connected to a main driven member and in which the toothed annular gear constitutes the reaction member, a hydraulic coupling having primary and secondary elements, the primary element of which is fixedly connected to the said reaction member of the epicyclic gear train, toothed annular gears fixedly connected to the respective elements of the said hydraulic coupling and disposed adjacent to one another, stepped planetary pinions meshing with the said toothed annular gears, a rotatable member carrying the said stepped planetary pinions and a sun pinion meshing with one step of said stepped planetary pinions.

6. Variable speed and reversing gearing comprising two gear units each consisting of an epicyclic gear train having a driving member, a driven member and a reaction member, a hydraulic coupling having primary and secondary elements, the primary element being fixedly connected to the said reaction member, and gearing between the said primary and secondary elements for restricting the relative speeds of the said elements to a fixed ratio, and furthermore comprising a common main driving member connected to different train members of the epicyclic gear trains of the respective gear units so that the gear trains act in opposite directions on a common main driven member, and means for rendering one gear unit inoperative while the other is transmitting power and vice versa.

7. Variable speed and reversing gearing comprising two gear units each consisting of an epicyclic gear train having a driving member, a driven member and a reaction member, a hydraulic coupling having primary and secondary elements, the primary element being fixedly connected to the said reaction member, and planetary gearing arranged to control the relative speeds of the primary and secondary elements, the said planetary gearing comprising stepped planetary pinions meshing with toothed annular gears fixedly connected to the respective elements prising two gear units each consisting of an epicyclic gear train having a driving member, a driven member and a reaction member, a hydraulic coupling having primary and secondary elements, the primary element being fixedly connected to the said reaction member, and gearing between the said primary and secondary elements for restricting the relative speeds of the said elements to a fixed ratio, and furthermore comprising a common main driving member connected to different train members of the epicyclic gear trains of the respective gear units so that the gear trains act in opposite directions to a common main driven member, means for rendering one gear unit inoperative while the other is transmitting power and vice versa, and a casing enclosing the said gearing and containing fluid for the operation of the said hydraulic couplings.

14. Variable speed and reversing gearing comprising two gear units each consisting of an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, plunger pump mechanism co-operating with actuating means therefor associated with the said sun wheel, and valve means controlling the said plunger pump mechanism for permitting variation of the relative speeds of the two elements of the said hydraulic coupling from zero up to the maximum ratio determined by the gearing controlling the said elements, and furthermore comprising a common main driving member connected to different train members of the epicyclic gear trains of the respective gear units so that the gear trains act in opposite directions to a common main driven member, a casing enclosing the said gearing and containing fluid for the operation of the said hydraulic couplings, and inlet and outlet connections to the said plunger pump mechanism, said connections communicating with the said casing for the circulation of fluid by the said plunger pump mechanism to and from the said casing.

15. Variable speed gearing of the type specified comprising an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, plunger pump mechanism co-operating with actuating means therefor associated with the said sun wheel, valve means controlling the said plunger pump mechanism for permitting variation of the relative speeds of the two elements of the said hydraulic coupling from zero up to the maximum ratio determined by the gearing controlling the said elements, a casing enclosing the said gearing and containing fluid for the operation of the said hydraulic coupling, and inlet and outlet connections to the said plunger pump mechanism, said connections communicating with the said casing for the circulation of fluid by the said plunger pump mechanism to and from the said casing.

16. Variable speed gearing of the type specified comprising an epicyclic gear train having an annular reaction member, a sun wheel and double stepped planetary gears the larger diameter of which co-operates with the said sun wheel and with the said reaction member to transmit the drive through the said train, a hydraulic coupling having primary and secondary elements, the primary element being fixedly connected to the said reaction member and the secondary element having an annular gear meshing with the smaller diameter of the said stepped planetary gears, whereby the elements are geared together so as to rotate in the same direction.

17. Variable speed gearing of the type specified comprising an epicyclic gear train having a driving member, a driven member and a reaction member, a hydraulic coupling having primary and secondary elements, the primary element being fixedly connected to the said reaction member, gearing between the said primary and secondary elements whereby the gear ratio between the said elements cannot exceed a predetermined maximum, means for controlling the torque transmitted between the elements of the said hydraulic coupling, mechanism connected to the said means for the adjustment thereof, a manual control for the said mechanism and a speed regulated control also connected to the said mechanism.

18. Variable speed gearing of the type specified comprising an epicyclic gear train having a driving member, a driven member and a reaction member, a hydraulic coupling having primary and secondary elements, the primary element being fixedly connected to the said reaction member, gearing between the said primary and secondary elements whereby the gear ratio between the said elements cannot exceed a predetermined maximum, means for controlling the torque transmitted between the elements of the said hydraulic coupling, mechanism connected to the said means for the adjustment thereof, a manual control for the said mechanism, a piston also connected to the said mechanism, a pump connected to the final drive of the speed gear, and means for transmitting fluid pressure exerted by the said pump to the said piston.

19. Variable speed gearing of the type specified comprising an epicyclic gear train having a driving member, a driven member and a reaction member, a hydraulic coupling having primary and secondary elements, the primary element being fixedly connected to the said reaction member, gearing between the said primary and secondary elements whereby the gear ratio between the said elements cannot exceed a predetermined maximum, means for controlling the torque transmitted between the elements of the said hydraulic coupling mechanism connected to the said means for the adjustment thereof, a manual control, a speed regulated control, and a lost motion device connecting the said manual and speed regulated controls together and to the said mechanism to permit of independent operation of the said manual and speed regulated controls.

ROLAND TREASURE STOCK.

of the hydraulic coupling and rotatable around a sun wheel, and furthermore comprising a common main driving member connected to different train members of the epicyclic gear trains of the respective gear units so that the gear trains act in opposite directions to a common main driven member, and means for rendering one gear unit inoperative while the other is transmitting power and vice versa.

8. Variable speed and reversing gearing comprising two gear units each consisting of an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, and means for normally holding the said sun wheel against rotation during operation of the gear and for allowing free rotation of the said sun wheel to permit the two elements of the hydraulic coupling to rotate at the same speed and thereby to render the gearing inoperative for the transmission of power, and furthermore comprising a common main driving member connected to different train members of the epicyclic gear trains of the respective gear units so that the gear trains act in opposite directions to a common main driven member, and means for rendering one gear unit inoperative while the other is transmitting power and vice versa.

9. Variable speed and reversing gearing comprising two gear units each consisting of an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, plunger pump mechanism co-operating with actuating means therefor associated with the said sun wheel, and valve means controlling the said plunger pump mechanism for permitting variation of the relative speeds of the two elements of the said hydraulic coupling from zero up to the maximum ratio determined by the gearing controlling the said elements, and furthermore comprising a common main driving member connected to different train members of the epicyclic gear trains of the respective gear units so that the gear trains act in opposite directions to a common main driven member.

10. Variable speed and reversing gearing comprising two gear units each consisting of an epicyclic gear train having a driving member, a driven member and a reaction member, a hydraulic coupling having primary and secondary elements, the primary element being fixedly connected to the said reaction member, planetary gearing arranged to control the relative speeds of the said primary and secondary elements, said planetary gearing comprising stepped planetary pinions meshing with toothed annular gears fixedly connected to the respective elements of the hydraulic coupling and rotatable around a sun wheel, plunger pump mechanism, eccentric operating means fixedly connected to the said sun wheel and co-operating with the said plunger pump mechanism, and valve means controlling the said plunger pump mechanism for permitting variation of the relative speeds of the two elements of the said hydraulic coupling from zero up to the maximum ratio determined by the gearing controlling the said elements, and furthermore comprising a common main driving member connected to different train members of the epicyclic gear trains of the respective gear units so that the gear trains act in opposite directions to a common main driven member, and means for rendering one gear unit inoperative while the other is transmitting power and vice versa.

11. Variable speed and reversing gearing comprising two sets of epicyclic gearing, a main driving member fixedly connected to the carrier of the planetary pinions of one set of planetary gearing and to the toothed annular gear of the other set of planetary gearing, a main driven member fixedly connected to the sun wheel of the first-mentioned set of planetary gearing and to the carrier of the planetary pinions of the second-mentioned set of planetary gearing, a hydraulic coupling associated with each set of planetary gearing and having primary and secondary elements, the primary element associated with the first-mentioned set of planetary gearing being fixedly connected to the toothed annular gear thereof and the primary element of the hydraulic coupling associated with the second set of planetary gearing being fixedly connected to the carrier of the planetary pinions of the said set, duplicate planetary gearing connecting the primary and secondary elements of each of said hydraulic couplings so as to restrict the relative speed of rotation thereof to a fixed maximum ratio, said duplicate planetary gearing including toothed annular gears fixedly connected to the respective primary and secondary elements of the hydraulic coupling, stepped planetary pinions meshing with said toothed annular gears and a sun pinion meshing with one step of said stepped planetary pinions, a rotatable sleeve carrying the said sun pinion, eccentric means upon said sleeve, plunger pump mechanism co-operating with said eccentric means, and valve means controlling said plunger pump mechanism for holding the said sun pinion stationary or permitting rotation thereof.

12. Variable speed and reversing gearing comprising two gear units each consisting of an epicyclic gear train having a driving member, a driven member and a reaction member, a hydraulic coupling having primary and secondary elements, the primary element being fixedly connected to the said reaction member, and gearing between the said primary and secondary elements for restricting the relative speeds of the said elements to a fixed ratio of between 90 and 99 revolutions per minute of the secondary element to 100 revolutions per minute of the primary element, and furthermore comprising a common main driving member connected to different train members of the epicyclic gear trains of the respective gear units so that the gear trains act in opposite directions to a common main driven member, and means for rendering one gear unit inoperative while the other is transmitting power and vice versa.

13. Variable speed and reversing gearing com-